United States Patent
Britsch

(10) Patent No.: US 11,685,348 B2
(45) Date of Patent: Jun. 27, 2023

(54) AGRICULTURAL VEHICLE-TRAILER COMBINATION

(71) Applicant: DEERE & COMPANY, Moline, IL (US)

(72) Inventor: Sebastian Britsch, Wurmberg (DE)

(73) Assignee: DEERE & COMPANY, Moline, IL (US)

( * ) Notice: Subject to any disclaimer, the term of this patent is extended or adjusted under 35 U.S.C. 154(b) by 202 days.

(21) Appl. No.: 17/181,528

(22) Filed: Feb. 22, 2021

(65) Prior Publication Data

US 2021/0331653 A1 Oct. 28, 2021

(30) Foreign Application Priority Data

Apr. 23, 2020 (DE) .................. 102020205201.8

(51) Int. Cl.
  *B60T 8/17* (2006.01)
  *B60T 7/20* (2006.01)
  *B60T 8/176* (2006.01)

(52) U.S. Cl.
  CPC .............. *B60T 8/1708* (2013.01); *B60T 7/20* (2013.01); *B60T 8/176* (2013.01); *B60T 2210/14* (2013.01); *B60T 2210/20* (2013.01); *B60T 2220/04* (2013.01)

(58) Field of Classification Search
  None
  See application file for complete search history.

(56) References Cited

U.S. PATENT DOCUMENTS 9,802,587 B2   10/2017   Morselli
10,086,810 B2  10/2018   Binder et al.
2018/0126968 A1  5/2018   Eckert et al.
2018/0334152 A1  11/2018  Hunt et al.
2018/0354478 A1* 12/2018  Eckert .................. B60T 8/1708

FOREIGN PATENT DOCUMENTS

DE   102014100069 A1     7/2015
DE   102014011500 A1     2/2016
EP       2570314 A1      3/2013
JP       3965218 B2  *   8/2007    .......... B60T 8/17636
WO   WO-2016015793 A1 *  2/2016    ............ B60T 8/1708

OTHER PUBLICATIONS

Extended European Search Report and Written Opinion issued in European Patent Application No. 21167956.8, dated Sep. 21, 2021, 7 pages.

* cited by examiner

*Primary Examiner* — Melanie Torres Williams

(57) ABSTRACT

An agricultural vehicle-trailer-combination includes a traction vehicle including an engine and at least one ground engagement mechanism. A trailer is coupled to the traction vehicle. A service brake connected to the at least one ground engagement mechanism. The combination includes a sensor and a control unit disposed in communication with the sensor, wherein a slip or a slip gradient on the ground engagement mechanism is sensed between the ground engagement mechanism and the ground surface. A trailer brake disposed on the trailer is adjustably controlled by the control unit. The trailer brake is adjustably controlled when the service brake of the traction vehicle is actuated, and the trailer is braked by the trailer brake as a function of the slip or the slip gradient when the slip reaches or exceeds a predeterminable slip braking value or the slip gradient reaches a predeterminable slip gradient braking interval.

12 Claims, 5 Drawing Sheets

AGRICULTURAL VEHICLE-TRAILER COMBINATION

RELATED APPLICATIONS

This application claims priority to German Application No. 102020205201.8, filed Apr. 23, 2020, the disclosure of which is hereby expressly incorporated by reference in its entirety.

FIELD OF THE DISCLOSURE

The present disclosure relates to an agricultural vehicle-trailer combination.

BACKGROUND

Agricultural vehicle-trailer-combinations having a traction vehicle and a trailer are known. In an agricultural vehicle-trailer-combination the traction vehicle, such as an agricultural traction vehicle, a tractor or towing vehicle, may pull a trailer which may be coupled or suspended or is coupled or suspended on the traction vehicle. A trailer may be, for example, a grain trailer or root crop trailer, a hay wagon, a brush cutter, a forage harvester, a baler or a similar vehicle. In this case, it is provided that the traction vehicle pulls the non-driven trailer since the traction of the traction vehicle is required in order to produce a movement. The agricultural vehicle-trailer-combination, however, may also be configured as a combined two-part forestry or snow vehicle. Similarly, a tractor, the frame thereof being articulated such that this frame exerts a steering action about a central point, may also be understood as a traction vehicle including a trailer. Such vehicles are sometimes denoted as "bidirectional" tractors or articulated tractors. Examples of such tractors with relatively small wheels are used, for example, in grass cultivation and in the forestry industry; and very large machines, in some cases with caterpillar tracks as ground engagement mechanism or mechanisms, are used on large farms.

In vehicle-trailer-combinations, since the transmission of a braking force to the ground via the ground engagement mechanism of the traction vehicle is limited, in braking procedures an instability, the phenomenon of jack-knifing, may occur. In this case, forces may be exerted by the trailer onto the vehicle which lead to self-steering behavior in the vehicle-trailer-combination due to oversteer. In particular, these forces may be exerted by the trailer onto the traction vehicle, for example, via a coupling between the traction vehicle and the trailer, or in the case of an articulated tractor via the steering joint from the rear half of the articulated chassis. The phenomenon may occur, in particular, when the total braking action of the traction vehicle is greater than that of the trailer vehicle which may occur, for example, very rapidly when a loaded trailer is coupled to an unloaded traction vehicle.

Additionally, the operator of the vehicle-trailer-combination has to assess the situation carefully in order to avoid jack-knifing, since the traction on a dry ground covering is better than on a slippery ground covering. If the vehicle-trailer-combination travels on a ground covering where high frictional forces act between the ground engagement mechanism and the ground covering, the combination may be braked, for example, only by the engine brake via the ground engagement mechanism of the vehicle. In the engine brake, by the transmission a comfortable and wear-free braking is possible, by the gear ratio together with the torque of the engine being increased. On a ground covering where low frictional forces act between the ground engagement mechanism and the ground covering, however, all of the ground engagement mechanisms of the combination have to be braked in order to achieve an optimal braking action without jack-knifing. This requires the actuation of the service brake. If jack-knifing occurs, the force exerted by the trailer may exceed the adhesion of the ground engagement mechanism of the traction vehicle, so that the vehicle-trailer-combination is brought into a swiveling situation, or even a skidding situation. The risk here is that even when a skidding situation does not occur, the driver is no longer able to control the vehicle-trailer-combination.

SUMMARY

In the present disclosure, there is a need for an agricultural vehicle-trailer-combination which substantially avoids the drawbacks known from the prior art, in particular an agricultural vehicle-trailer-combination comprising a traction vehicle and a trailer which permits the improvement of the braking of the vehicle-trailer-combination in order to eliminate or at least to reduce the risk of jack-knifing.

According to the present disclosure, an agricultural vehicle-trailer-combination including a traction vehicle and a trailer is proposed. The traction vehicle comprises an engine and at least one ground engagement mechanism for support on a ground surface. The ground engagement mechanism in this case is connected in terms of drive to the engine by a transmission. Moreover, the traction vehicle comprises a service brake and the traction vehicle is able to be braked by the engine, i.e., an engine brake, or by the service brake.

Moreover, the traction vehicle comprises a sensor and a control unit, wherein by the sensor and the control unit a slip S or a slip gradient $\nabla S$ on the ground engagement mechanism may be sensed or determined, in particular a slip S or a slip gradient $\nabla S$ between a ground surface and the ground engagement mechanism. The trailer comprises a trailer engagement mechanism. The trailer comprises a trailer brake, wherein the trailer brake is adjustable by the control unit. The trailer brake is adjustable by the control unit when the engine brake or service brake of the traction vehicle are actuated or during the actuation thereof, in particular with the simultaneously actuated engine brake or service brake or during the simultaneous actuation thereof. The trailer is braked by the trailer brake as a function of the slip S or the slip gradient $\nabla S$ when the slip S reaches or exceeds a predeterminable slip braking value $S_{threshold1}$ or the slip gradient $\nabla S$ or $\vec{\nabla S}$ reaches a predeterminable slip gradient-braking interval $\nabla S_{braking}$ or $\overline{\nabla S}_{braking}$, in particular is located in a predeterminable slip gradient-braking interval $\nabla S_{braking}$ or $\overline{\nabla S}_{braking}$. The slip gradient-braking interval $\nabla S_{braking}$ in this case may be defined as follows $\nabla S_{braking} = [\nabla S_{threshold11}, \nabla S_{threshold2}]$ and thus is limited by an upper slip gradient $\nabla S_{threshold2}$ and a lower slip gradient $\nabla S_{threshold1}$. In vector notation, the slip gradient braking interval $\vec{\nabla S}_{braking}$ may be defined as follows $\vec{\nabla S}_{braking} = [\vec{\nabla S}_{threshold1}, \vec{\nabla S}_{threshold2}]$, i.e., is limited by an upper slip gradient $\vec{\nabla S}_{threshold2}$ and a lower slip gradient $\vec{\nabla S}_{threshold1}$.

The traction vehicle may have two, three or four or more ground engagement mechanisms. The ground engagement mechanism of the traction vehicle may be tires or a track, in particular crawler track, or caterpillar track. Moreover, the engine of the traction vehicle may drive the one or more ground engagement mechanisms. The engine may drive, in particular, two or four of the ground engagement mechanisms. The one or more ground engagement mechanisms may be arranged, in particular coupled, onto an axle and the axle may be driven or is drivable by the engine. If the traction vehicle is provided with four ground engagement mechanisms acting on the ground, for example, wheels or the aforementioned other elements such as tracks, the present disclosure may be used irrespective of whether all four or only two of the ground engagement mechanisms are driven by the traction vehicle. A traction vehicle may also comprise a driver's cab.

The trailer may comprise further ground engagement mechanism, for example, tires or a track, in particular a crawler track, or caterpillar track. The trailer brake may be provided for braking the further ground engagement mechanism or a further axle which connects the ground engagement mechanism. In this case, one or more trailer brakes may be provided, for example, one trailer brake for each further ground engagement mechanism.

The agricultural vehicle-trailer-combination may comprise one or more sensors. By the sensors and the control unit, a slip S between a ground surface and the ground engagement mechanism may be sensed, in particular detected or determined. In the case of the sensor(s), in particular by the sensor(s), a parameter of the ground engagement mechanism may be sensed, in particular detected or determined. In particular, by the sensor(s) a speed or a rotational speed of the ground engagement mechanism may be sensed, in particular detected, or determined. In particular, one respective sensor may be provided for each ground engagement mechanism. From the rotational speed of the ground engagement mechanism, the speed of the ground engagement mechanism may be determined by the control unit. Moreover, an actual speed of the agricultural vehicle-trailer-combination, in particular of the traction vehicle, may be present or determined or measured. Using the speed of the ground engagement mechanism determined from the rotational speed or the directly measured speed of the ground engagement mechanism and the actual speed of the agricultural vehicle-trailer-combination, in particular of the traction vehicle, the slip S may be determined. In turn, the slip gradient ∇S may be determined by the slip S. The slip S, in this case as the ratio of the rotational speed of a driven wheel n to that of a (hypothetical) non-driven and thus positively entrained wheel no, may be represented as $$S = \frac{n - n_0}{n_0}.$$

Thus, the slip S or using the slip S, the slip gradient ∇S, in particular a braking slip or braking slip gradient, may be determined by the difference between or ratio of the two rotational speeds or speeds. The control unit, however, may determine, in particular calculate, the slip gradient ∇S or $\vec{\nabla S}$, for example, also using the difference between two slips $\vec{\nabla S} = \vec{S}_1 - \vec{S}_2$ or in terms of value $\nabla S = |\vec{S}_1 - \vec{S}_2|$ or by the difference between two slips per time unit $$\nabla S = \frac{S_1 - S_2}{t_1 - t_2}.$$

The slip S or me slip gradient ∇S may be determinable, in particular calculable, by the control unit. In the case of travel without slip, therefore, the speed of the traction vehicle corresponds to the speed of the ground engagement mechanism. A braking slip or braking slip gradient is present when the speed of the ground engagement mechanism is below the speed of the traction vehicle. This may be the case, in particular, when the engine brake or service brake of the traction vehicle is actuated or during the actuation thereof.

In particular, the sensor(s) may produce or generate a sensor signal for a parameter, in particular for the rotational speed or speed of the ground engagement mechanism. The sensor signal may also be forwarded from the sensor to the control unit or received and processed by the control unit. The control unit may determine, in particular calculate, by the sensor signal the slip S or by the slip S determine the slip gradient ∇S, i.e., in particular evaluate the sensor signal. Moreover, the control unit may comprise an electronic module, an embedded system, a memory module or a processor. The control unit may be signal-connected to the one or more sensors or the engine, the transmission, the trailer brake, the service brake or further sensors, i.e., so as to transmit data. The connection may be implemented in a wired or wireless manner, i.e., by radio. The communication bus, for example, may be an Isobus, CAN bus or the like. Moreover, the vehicle-trailer-combination may be controlled or regulated by the control unit or a further control unit. The control unit (ECU=electronic control unit or ECM=electronic control module) may be an electronic module or embedded system. The control unit may be arranged on the traction vehicle or arranged in two parts on the traction vehicle and the trailer. In particular, a further control unit may also be provided so that two control units, a first for the traction vehicle and a second for the trailer, are provided. The control unit in this case may be signal-connected to the further control unit or the connection may be implemented in a wired or wireless manner, i.e., by radio. The control unit may transmit signals to the further control unit and receive signals therefrom. Moreover, the sensor, the engine, the transmission or the trailer brake may be adjustable or adjusted by the control unit. Moreover, a braking force of the engine brake or the service brake may be adjustable by the control unit.

In this disclosure, the stabilizing of the agricultural vehicle-trailer-combination, when the engine brake or service brake of the traction vehicle is actuated or during the actuation thereof, takes place as a function of the slip S or the slip gradient ∇S by the braking of the trailer, in particular the activation of the trailer brake, as a function of the slip S or the slip gradient ∇S. The trailer brake is activated, i.e., the trailer is braked, when the slip S reaches or exceeds a predeterminable slip braking value $S_{threshold1}$ or the slip gradient ∇S reaches a predeterminable slip gradient-braking interval $\nabla S_{braking}$. If this is the case, the one or more ground engagement mechanism may be braked by the trailer brake. In this case, in particular, it may apply that the predeterminable slip braking value $S_{threshold1}$ is greater than 0. Thus, the trailer is braked, i.e., the trailer brake is activated or the one or more ground engagement mechanism of the trailer are braked, by the trailer brake, when the following applies to the slip value S $S \geq S_{threshold1}$, in particular where $S_{threshold1} > 0$ or the slip gradient ∇S adopts a value from the slip gradient braking interval $\nabla S_{braking}$, i.e., $\nabla S \in \nabla S_{braking}$.

In other words, the sensor and the control unit of the traction vehicle sense or determine the slip S or slip gradient ∇S between the ground and the ground engagement mechanism. The control unit determines or monitors whether, when the engine brake or service brake of the traction vehicle is actuated, the slip S reaches or exceeds a predeterminable slip braking value $S_{threshold\ 1}$ or the slip gradient $\nabla S$ reaches the predeterminable slip gradient braking interval $\nabla S_{braking}$, in particular is located in the predeterminable slip gradient braking interval $\nabla S_{braking}$. If this is the case, the control unit may output a braking request signal for the output of at least one trailer brake control signal to the trailer brake for braking the trailer, i.e., the trailer brake is adjustable or activatable by the control unit such that the trailer is braked by the trailer brake, in particular the ground engagement mechanism is braked by the trailer brake. The trailer brake may be adjustable by the control unit such that the trailer is braked by the trailer brake as a function of a braking slip (i.e., a negative slip S) or of a braking slip gradient (i.e., a negative slip gradient $\vec{\nabla S}$) when the value of the braking slip reaches or exceeds the predeterminable slip braking value $S_{Schwelle\ 1}$ or the braking slip gradient reaches the predeterminable slip gradient braking interval $\nabla S_{braking}$, in particular is located in the predeterminable slip gradient braking interval $\nabla S_{braking}$.

The conditions $S \geq S_{threshold1}$ differ substantially from one another, in particular where $S_{threshold1} > 0$ or the slip gradient $\nabla S$ adopts a value from the slip gradient braking interval $\nabla S_{braking}$, i.e., $\nabla S \in \nabla S_{braking}$. The condition $S \geq S_{threshold1}$ where $S_{threshold1} > 0$ is a condition which is able to be implemented in a technically simple manner for braking the trailer. The condition $\nabla S \in \nabla S_{braking}$, however, has the advantage that since the slip gradient $\nabla S$ describes a tendency of the slip S to change, a prediction about the slip behavior is possible, i.e., a statement about the predicted development of the slip S.

A braking of the trailer based on the condition $\nabla S \in \nabla S_{braking}$, in contrast to the individual conditions $S \geq S_{threshold1}$, has the advantage that the trailer brake and thus the braking force of the trailer is activated in a targeted manner only in the case of a change of the slip $\nabla S \in \nabla S_{braking}$ which is too rapid or too great.

The two conditions may advantageously also be combined together such that the trailer is braked. In other words, the trailer brake is activated when the conditions $S \geq S_{threshold1}$ and $\nabla S \in \nabla S_{braking}$ are fulfilled. A braking of the trailer based on the combination of the conditions $S \geq S_{threshold1}$ and $\nabla S \in \nabla S_{braking}$ in turn has the advantage in contrast to the individual conditions $S \geq S_{threshold1}$ that the trailer brake and thus the braking force of the trailer is activated in a targeted manner only when the slip S is too great, in combination with a change to the slip S which is too rapid or too great. As a result, in contrast to the individual conditions $S \geq S_{threshold1}$, the braking behavior, i.e., the braking of the trailer, may be adapted to the ground covering (for example, asphalt or earth) or the surface properties of the ground covering (wet or dry surface). The activation of the trailer brake may also be carried out in a more optimal and accurate manner, i.e., when too great a level of slip $S \geq S_{threshold1}$ is present the trailer brake is activated only when a critical situation is actually present, i.e., where $\nabla S \in \nabla S_{braking}$, due to the association with a trend of the slip behavior on the basis of the slip gradient $\nabla S$.

It is advantageous for the disclosure as a whole that the pushing effect or creation of a pulling effect, i.e., a braking force of the trailer onto the traction vehicle, is reduced thereby. All three possible conditions thus prevent that jack-knifing occurs on the vehicle-trailer-combination and prevent this leading to a swiveling situation or even a skidding situation. Moreover, a reduction in the pushing effect or creation of a pulling effect does not take place as soon as a slip S is measured, i.e., as soon as $S \neq 0$ but, in particular, only when $S \geq S_{threshold1}$ or $\nabla S \in \nabla S_{braking}$. As a result, the trailer brake and thus the braking force of the trailer may be activated in a targeted manner. Moreover, the stabilizing may be optimized thereby. Moreover, the stabilizing of the vehicle-trailer-combination is carried out in a simple manner since the braking of the trailer takes place solely on the basis of the slip S or the slip gradient $\nabla S$. In particular, more complex observations of the slip S or the slip gradient $\nabla S$ of the trailer are eliminated. Also advantageous is the differentiation between the slip S or slip gradient $\nabla S$. The braking of the trailer as a function of the slip gradient $\nabla S$, in contrast to the dependence on slip S, permits a more accurate and finer tuning of the activation of the trailer brake, in particular on the ground covering or the surface properties of the ground covering, since by the slip gradient $\nabla S$ a statement about the development or tendency of the slip S may be made. The pushing effect of the trailer on the traction vehicle may advantageously be fully determined from data or signals of the traction vehicle, for example, as a braking overrun mode or as an engine braking effect.

In one embodiment of the disclosure, the control unit is able to be operated, in particular the service brake or the trailer brake are adjustable by the control unit, such that the service brake or the trailer brake are released as a function of the slip S or slip gradient $\nabla S$ when the slip S reaches or exceeds a predeterminable slip blocking value $S_{threshold2}$ or the slip gradient $\nabla S$ reaches a predeterminable slip gradient blocking interval $\nabla S_{blocking}$, where $\nabla S_{blocking} = [\nabla S_{threshold3}, \nabla S_{threshold4}]$, in particular is in a predeterminable slip gradient blocking interval, i.e., $\nabla S \in \nabla S_{blocking}$ applies. In this case both the slip gradient $\nabla S$ and the slip gradient blocking interval may also be represented, in a similar manner to the above notation, in vector notation. The service brake of the traction vehicle and the trailer brake may thus be released when either $S \geq S_{threshold2}$ applies for the slip value S or where $S_{threshold2} \geq 0$, or $\nabla S \in \nabla S_{blocking}$ applies for the slip gradient $\nabla S$. In this case, $S_{threshold2} > S_{threshold1}$ may apply, and thus the slip blocking value $S_{threshold2}$ may be greater than the slip braking value $S_{threshold1}$. However, as an exclusion condition it may also be monitored whether a drive slip control system or a stability system is active on the traction vehicle and, with the presence of a drive slip control system or a stability system on the traction vehicle, the trailer brake of the trailer vehicle may not be activated or is not activatable.

The stability system may, in particular, be a driving stability control system or as described above, a system in which, for example, a service brake on one or more ground engagement mechanisms or the trailer brake on a further ground engagement mechanism is released. In particular, the stability system may be an anti-lock braking system (ABS). Both in the presence of the conditions $S \geq S_{threshold2}$ or $\nabla S \in \nabla S_{blocking}$, and with a further exclusion condition, an activation of the trailer brake, in particular a braking of the trailer, may be excluded for safety reasons, advantageously in order not to generate any disturbing influences by a braking action of the trailer. Moreover, it is advantageous that the targeted braking of the vehicle-trailer-combination and of a drive slip control system or a stability system may be combined together.

In one embodiment of the disclosure, the sensor is a speed sensor, wherein a speed of the ground engagement mechanism may be sensed by the speed sensor and a slip S may be determined from the speed, i.e., the rotational speed, by the control unit. The vehicle-trailer-combination may include a position determining system such as a radar sensor or a GPS system. The sensor may also be a rotational speed sensor, wherein a rotational speed of the ground engagement mechanism may be sensed or detected by the rotational speed sensor or a slip S may be determined from the rotational speed by the control unit. The speed sensor or the rotational speed sensor may generate a speed signal or a rotational speed signal and transmit this to the control unit.

Moreover, by the position determining system, i.e., the GPS system or the radar sensor, an actual speed of the agricultural vehicle-trailer-combination may be determined or measured and transmitted to the control unit. Finally, by the control unit, the slip S between the ground engagement mechanism and the ground may be calculated from the speed or the rotational speed of the ground engagement mechanism (e.g., the speed signal or the rotational speed signal) and the actual speed determined. From the slip S the control unit may determine a slip gradient $\nabla S$. The agricultural vehicle-trailer-combination may comprise one or more speed sensors or rotational speed sensors, in particular one respective speed sensor or rotational speed sensor per ground engagement mechanism. The rotational speed sensor may sense the rotational speed of the ground engagement mechanism and generate a rotational speed signal. The speed sensor or the rotational speed sensor may be signal-connected to the control unit. The control unit may also determine the slip S from the rotational speed or the rotational speed signal of a driven axle of the traction vehicle and of a further axle of the traction vehicle. The actual speed may be present as a reference speed on the control unit. Advantageously, the slip S or slip gradient $\nabla S$ may thus be determined in a simple manner. It may also be provided to combine the disclosure with a tire pressure control system, known per se, so that the advantages of both systems complement one another. As already mentioned above, it is intended thereby to adjust or to change the tire pressure, in addition to the braking force of the trailer, as a function of the slip S. This is carried out in terms of the technical possibilities relative to an evacuation or filling of a corresponding air quantity in the ground engagement mechanism. In this case, it is provided to adapt the tire pressure in an optimal manner to the prevailing conditions using average slip values, by the tire pressure being increased or reduced according to the situation, so that a jack-knifing of the vehicle-trailer-combination is avoided.

In one embodiment of the disclosure, the slip braking value $S_{threshold1}$ or the slip gradient braking interval $\nabla S_{braking}$ or slip blocking value $S_{threshold2}$ or slip gradient blocking interval $\nabla S_{blocking}$ are able to be determined, predetermined, or adjusted by the control unit. Alternatively, a mathematical equation, a characteristic diagram or a measuring field is stored in the control unit by which one or more of the following parameters may be taken into consideration when determining the slip braking value $S_{threshold1}$, the slip gradient braking interval $\nabla S_{braking}$, the slip blocking value $S_{threshold2}$ or slip gradient blocking interval $\nabla S_{blocking}$—tire type, ground type, ground conditions, speed or axle load distribution, actuation of the gas pedal, the engine generates no useful torque, a retarder system is active, or the traction vehicle is located on a sloping section.

The slip braking value $S_{threshold1}$ or the slip gradient braking interval $\nabla S_{braking}$ or slip blocking value $S_{threshold2}$ or slip gradient blocking interval $\nabla S_{blocking}$ may be determined by that the threshold values or interval limits being able to be determined by the control unit. For example, the mathematical equation or the characteristic diagram or the measuring field for each parameter may be stored in the control unit. When determining the slip braking value $S_{threshold1}$, the slip gradient braking interval $\nabla S_{braking}$, the slip blocking value $S_{threshold2}$ or the slip gradient blocking interval $\nabla S_{blocking}$ by the control unit, therefore, one or more of the parameters may influence the calculation of the threshold values, i.e., $S_{threshold1}$ or $S_{threshold2}$, and interval limits, i.e., $\nabla S_{braking}$ or $\nabla S_{blocking}$, by, for example, correcting the threshold values or interval limits up or down. Similarly, one or more of the parameters may also be sensed via further sensors, for example, a camera, an infrared sensor, radar sensor, etc., and stored in the control unit as real measured values in the form of a measuring field. In this case, a further sensor may be provided for each parameter. It is also possible that the position determining system, in particular the GPS system, which is established in any case in the field of agriculture, is integrated in the traction vehicle as an input device.

The parameters may be predetermined via an electronic connection or radio-based connection, in particular in cooperation with the position determining system, and stored in the control unit. However, different algorithms for determining or regulating the parameter(s) may also be stored in the control unit. Moreover, changes and variations in the aforementioned parameters may also be represented in the at least one characteristic diagram (or in further characteristic diagrams which are stored in the one or two control units) so that, for example, the type of tire is taken into consideration. In this case, the operator may predetermine corresponding presettings, such as the tire manufacturer, tire size, tire width, type of construction, profile, etc., by the input device in the one or two control units so that a corresponding algorithm considering the type of tire may be recalled and form the basis of the control or regulation of the trailer brake. Advantageously, the parameters of the vehicle-trailer-combination may influence the determination or adjustment of the slip braking value $S_{threshold1}$, the slip gradient braking interval $\nabla S_{braking}$, the slip blocking value $S_{threshold2}$ or the slip gradient blocking interval $\nabla S_{blocking}$ by the control unit, so that the slip braking value $S_{threshold1}$, the slip gradient braking interval $\nabla S_{braking}$, the slip blocking value $S_{threshold2}$ or the slip gradient blocking interval $\nabla S_{blocking}$ may be determined more accurately and adapted to the vehicle-trailer-combination.

In one embodiment of the disclosure, a measuring field, a mathematical equation or a characteristic diagram is stored the control unit by which one or more of the following parameters may be taken into consideration during a control or regulation of the vehicle-trailer-combination, in particular the trailer brake—tire type, ground type, ground conditions, speed or axle load distribution, actuation of the gas pedal, the engine generates no useful torque, a retarder system is active, or the traction vehicle is located on a sloping section. Advantageously, therefore, the vehicle-trailer-combination may be controlled or regulated such that jack-knifing is prevented and the occurrence of a swiveling situation or even a skidding situation is avoided.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
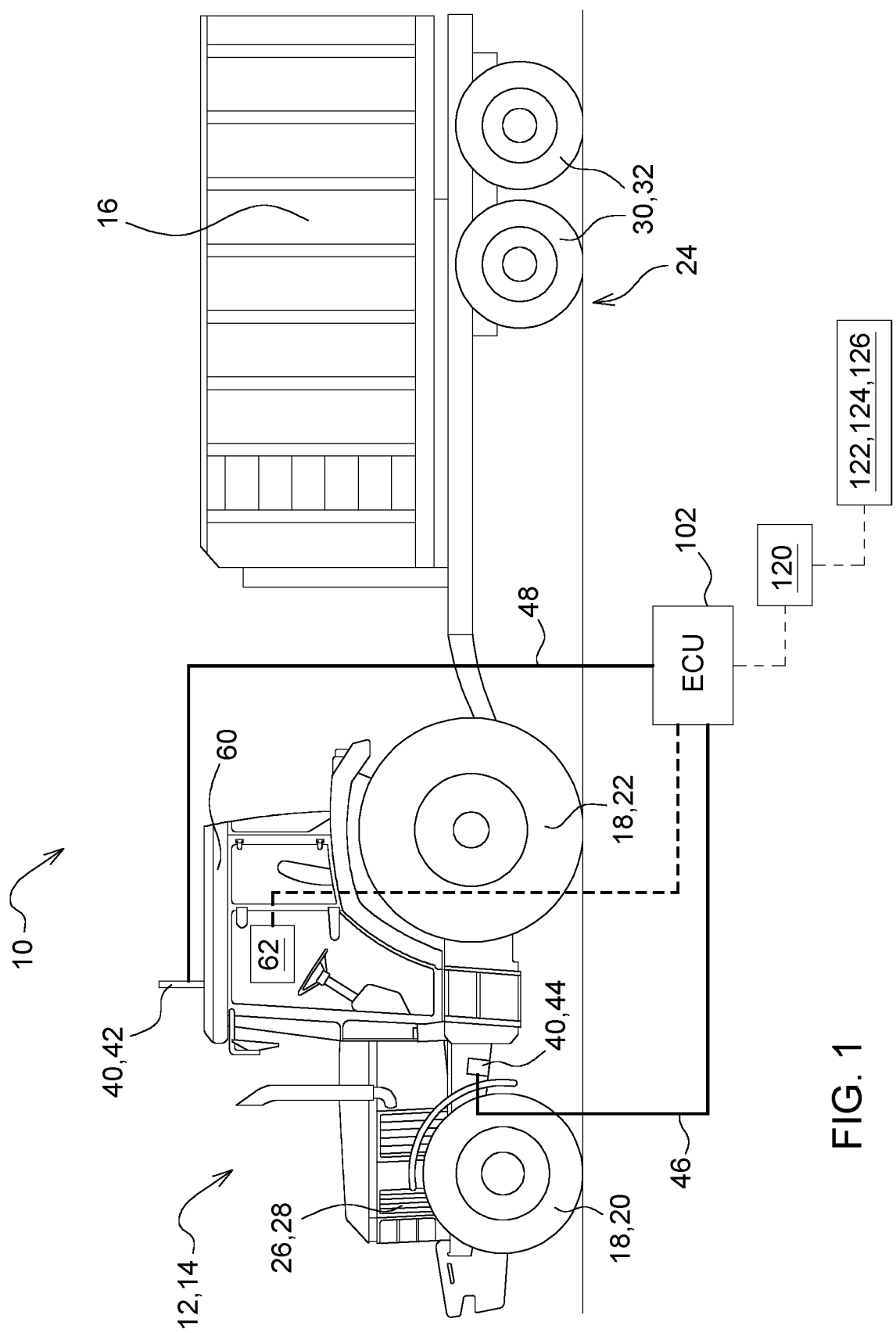
FIG. 1 shows a schematic view of a first embodiment of an agricultural vehicle-trailer-combination according to the present disclosure.
Figure 2:
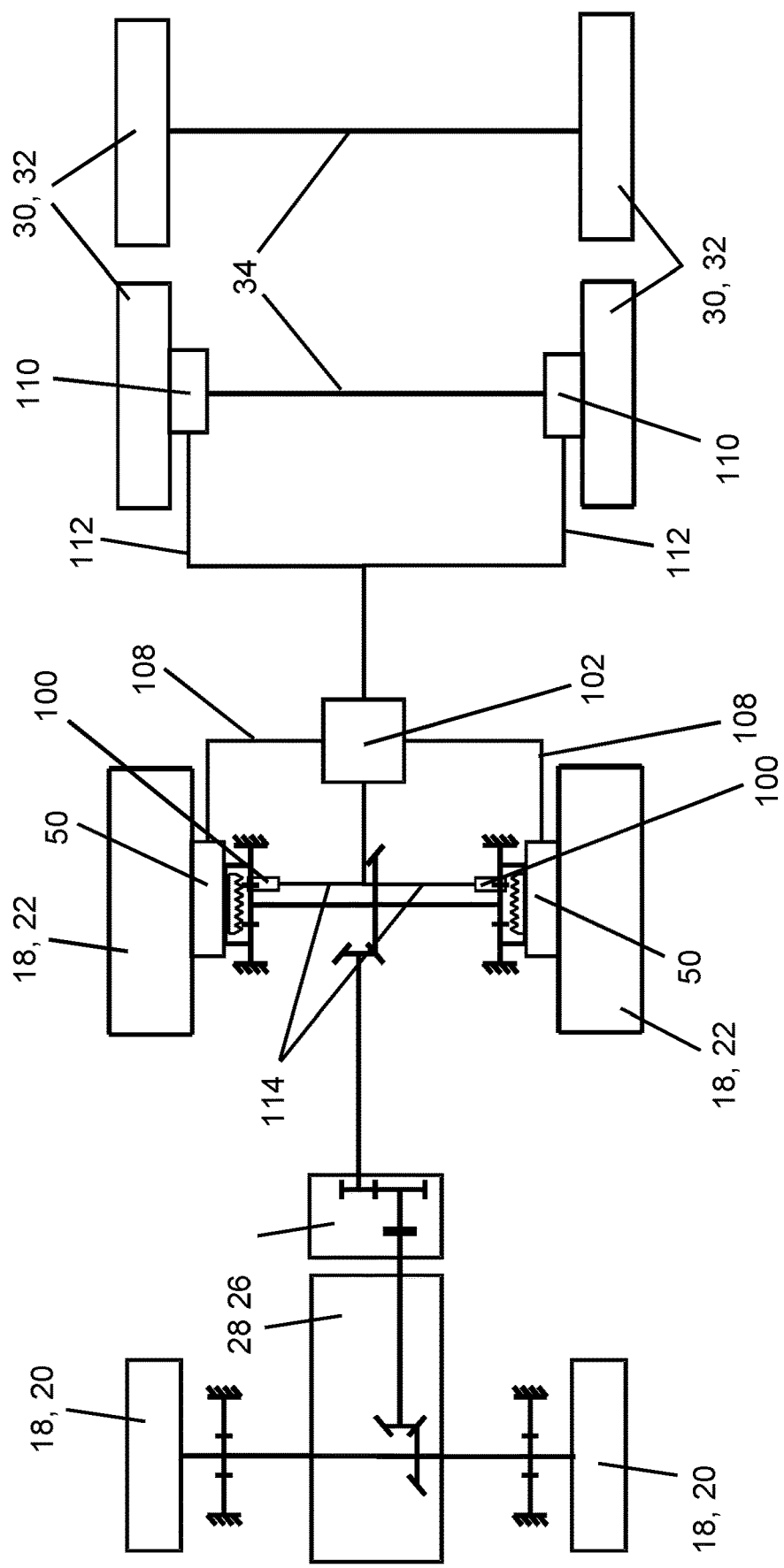
FIG. 2 shows a schematic sectional view of the first embodiment of the agricultural vehicle-trailer-combination of FIG. 1.

FIGS. 1 and 2 show a schematic view (FIG. 1) and a schematic sectional view from above (FIG. 2) of a first embodiment of an agricultural vehicle-trailer-combination 10 according to the present disclosure with a traction vehicle 12 in the form of a tractor 14 and a trailer 16. The second and third embodiments shown in FIGS. 3 and 4 substantially coincide with the first embodiment shown in FIGS. 1 and 2, so that the following description describes FIGS. 1 to 4 and the differences between the different embodiments are detailed.

The tractor 10 comprises ground engagement mechanism 18, in this case front wheels 20 and rear wheels 22, via which the tractor is supported on a substrate 24 (ground, road, field). The trailer 16 comprises further ground engagement mechanism 30 which are configured in this case as wheels 32. The ground engagement mechanism 18 of the traction vehicle 12 are connected in terms of drive to an engine 28 of the traction vehicle 12 by a transmission 26. In this case it is provided that the traction vehicle 12 pulls the non-driven trailer 16 since the traction of the traction vehicle 12 is required in order to effect a movement of the trailer 16. Moreover, with an advance of the traction vehicle over the substrate, a slip S is present between the ground engagement mechanism 18 and substrate 24.

Figure 3:
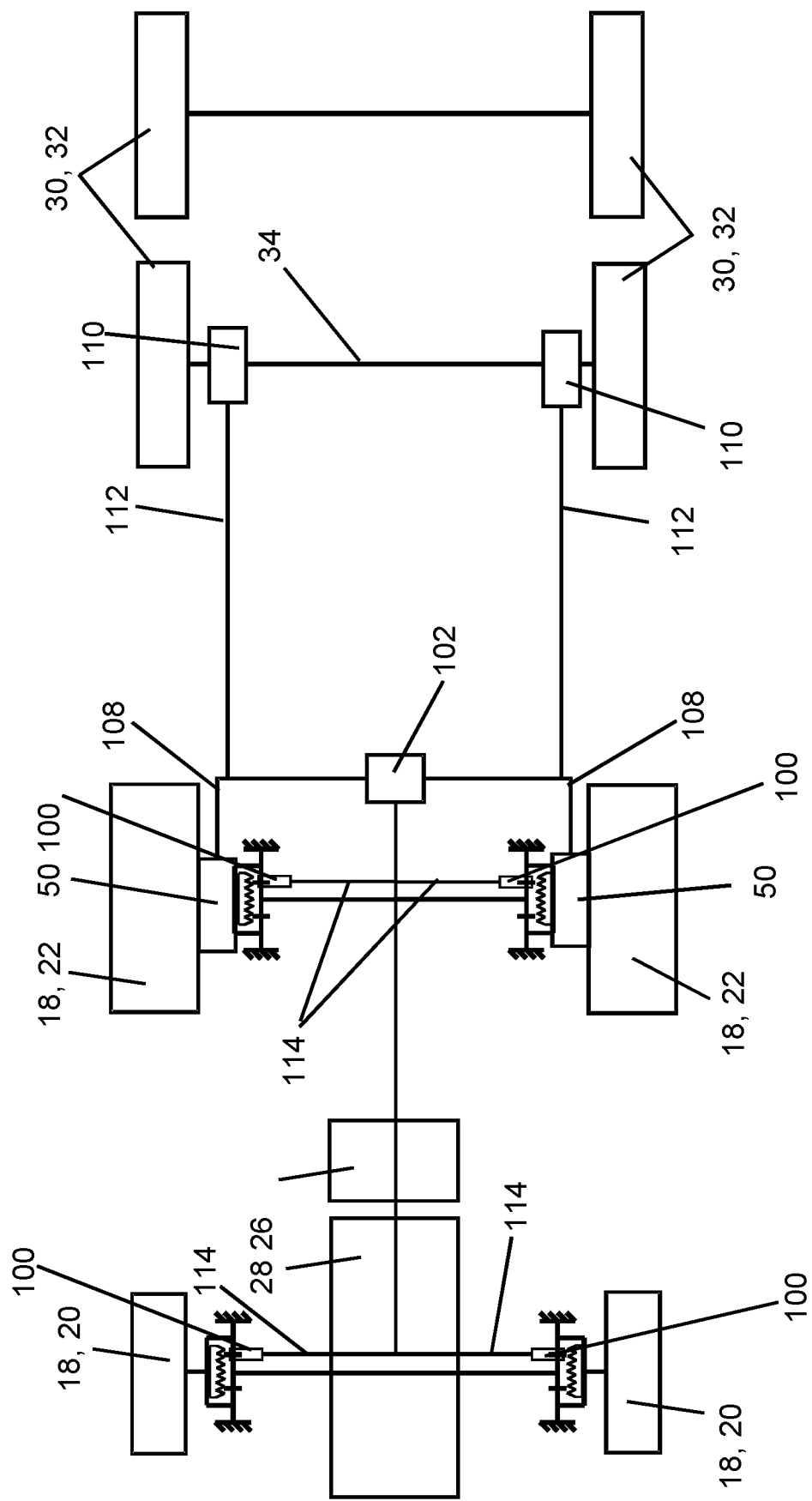
FIG. 3 shows a schematic sectional view of a second embodiment of an agricultural vehicle-trailer-combination according to the present disclosure.
Figure 4:
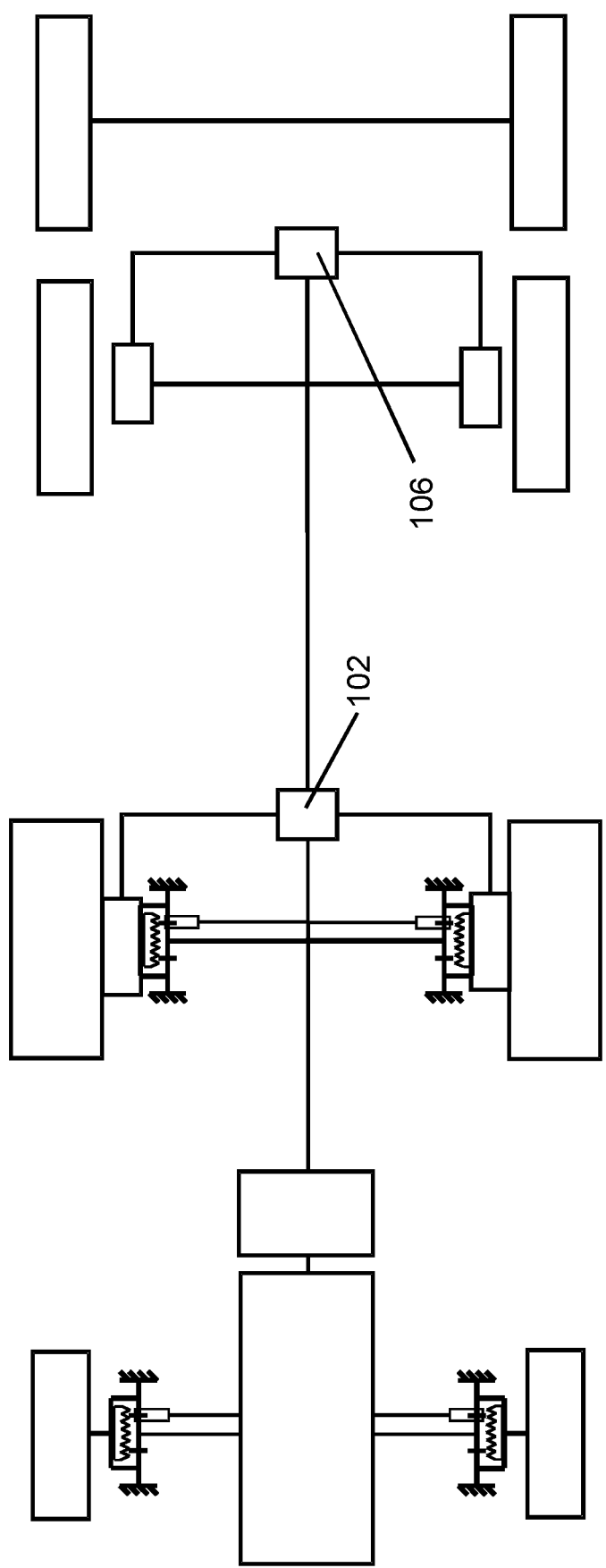
FIG. 4 shows a schematic view of a third embodiment of the agricultural vehicle-trailer-combination according to the present disclosure.

The traction vehicle 12 further comprises a service brake (reference numeral 50 see FIGS. 2 to 4). The traction vehicle 12 is able to be braked by the engine 28, i.e., the engine brake, or by the service brake 50. The traction vehicle 12 also has one or more sensors (reference numeral 100, see FIGS. 2 to 4) and a control unit 102, wherein by the sensor 100 and the control unit 102 a slip S or a slip gradient ∇S on the ground engagement mechanism 18, in particular between the substrate 24 and the ground engagement mechanism 18, is able to be sensed or determined. The sensors 100 are connected via control lines 108 to the control unit 102 but may also be connected in a different known manner, for example, by radio, to the control unit 102.

The trailer 16 includes one or more trailer brakes (reference numeral 110 see FIGS. 2 to 4), wherein the trailer brakes 110 are either connected via one or more further control lines 112 or also in a different manner, for example, by radio, to the control unit 102. The trailer brake 110 is provided for braking the one or more ground engagement mechanism 30 but may also be provided for braking a trailer axle (reference numeral 34 see FIGS. 2-4) which connects the ground engagement mechanism 30. A trailer brake 110 may also be provided on each of the ground engagement mechanisms 30. The trailer brake 110 is adjustable by the control unit 102. The trailer brake 110 is in this case adjustable by the control unit 102, when the engine brake or service brake 50 of the traction vehicle 12 is actuated or during the actuation thereof, such that the trailer 16 is braked by the trailer brake 110 as a function of the slip S or the slip gradient ∇S when the slip S reaches or exceeds a predeterminable slip braking value $S_{threshold1}$ or the slip gradient ∇S reaches a predeterminable slip gradient braking interval $∇S_{braking}$, in particular is located in the predeterminable slip gradient braking interval $∇S_{braking}$. In this case, a further control unit (reference numeral 106 see FIG. 4) may be arranged on the trailer 16 and assigned thereto so that the control unit 102 transmits a control signal to the further control unit 106 and the further control unit 106 adjusts the trailer brake 110 in the manner of the control unit 102.

The vehicle-trailer-combination 10, in particular the traction vehicle 12, 14, may also comprise a position determining system 40, for example, a GPS system 42 or a radar sensor 44, which also may be connected via corresponding control lines 46, 48 or alternatively to the control unit 102.

The sensor 100 may be a speed sensor 104. A speed of the one or more ground engagement mechanism 18 may be sensed by the speed sensor, in particular a speed of the agricultural vehicle-trailer-combination 10 (e.g., the traction vehicle 12) subjected to slip S, may be determined or measured. In particular, the sensor 100 is a rotational speed sensor 104, wherein a rotational speed of the ground engagement mechanism 18 is able to be sensed by the rotational speed sensor 104. However, a rotational speed of a traction vehicle axle 34 of the traction vehicle 12 may also be sensed by the rotational speed sensor 104. For example, a plurality of sensors 100 such as rotational speed sensors 104 are provided on the rear wheels 22 (see FIGS. 2 to 4) and also on the front wheels 20 of the traction vehicle 12 (see FIGS. 3 to 4). The sensors 100, 104 are connected via further control lines 114 to the control unit 102, but may also be connected in a different manner, for example, by radio, to the control unit 102. From the rotational speed of the ground engagement mechanism 18, the speed of the ground engagement mechanism 18 may be determined by the control unit 102.

Moreover, an actual speed of the agricultural vehicle-trailer-combination 10 may be determined or measured by the position determining system 40, i.e., the GPS system 42 or the radar sensor 44. The slip S may be determined using the rotational speed or speed of the ground engagement mechanism 18 and the actual speed. In turn, the slip gradient ∇S may be determined by the slip S. The slip S or the slip gradient ∇S are able to be determined or calculated by the control unit 102. Therefore, a speed affected by slip S or the slip gradient ∇S of the traction vehicle 12 may be sensed and determined by a rotational speed or speed of the front or rear wheels 18, 20, 22 of the traction vehicle 12, an actual rotational speed or speed of the front or rear wheels 18, 20, 22 of the traction vehicle 12 and, in particular, the geometric dimensions of the front or rear wheels 18, 20, 22 of the traction vehicle 12.

The slip S or the slip gradient ∇S are used for controlling or regulating the braking of the agricultural vehicle-trailer-combination 10. It is possible to brake the trailer 16 by the trailer brake 110 as a function of the slip S or the slip gradient VS sensed on the traction vehicle 12. Advantageously, the regulation of the slip S provided by the control unit 102 may be lowered again or maintained below the slip braking value $S_{threshold1}$ or the slip gradient VS may be kept outside the slip gradient braking interval $VS_{braking}$ by the trailer brake 110 being activated and the trailer 16 being braked. Thus, overall an optimal braking action without jack-knifing may be achieved and may even be automatically adjusted.

The control unit 102, 106 is also able to be operated. Further, the engine brake, the service brake 50, or the trailer brake 110 is able to be adjusted by the control unit 102, 106, such that the engine brake, the service brake 50, the trailer brake 110 is released as a function of the slip S or slip gradient VS when the slip S reaches or exceeds a predeterminable slip blocking value $S_{threshold2}$ (reference numeral 214 in FIG. 5) or the slip gradient VS reaches a predeterminable slip gradient blocking interval $VS_{blocking}$ where $VS_{blocking}=[VS_{threshold3}, VS_{threshold4}]$, in particular, is in a predeterminable slip gradient blocking interval.

The traction vehicle 12 further includes a cab 60 in which an input device 62 may be arranged, via which an operator, for example, may input information relative to the slip braking value $S_{threshold1}$, the slip gradient braking interval $VS_{braking}$, the slip blocking value $S_{threshold2}$, or the slip gradient blocking interval $VS_{blocking}$. The input device 62 is electronically connected via an input control line 64 or via radio to the control unit 102.

Similarly, the slip braking value $S_{threshold1}$, the slip gradient braking interval $VS_{braking}$, the slip blocking value $S_{threshold2}$, or the slip gradient blocking interval $VS_{blocking}$ are also determinable, calculable, predeterminable or adjustable, however, by the control unit 102 as a function of the parameters described hereinafter of the vehicle-trailer-combination 10. Moreover, a mathematical equation 122 which describes a mathematical or physical connection or a characteristic diagram 124 may be stored in one or each of the control units 102, 106. However, a measuring field 126, which includes one or more real measured values of the following parameters sensed by other sensors, may also be stored in the control unit 102, 106. By the mathematical equation 122, the characteristic diagram 124, or the measuring field 126 stored in the control unit 102, 106, one or more of the following parameters may be taken into consideration when determining the slip braking value $S_{threshold1}$, the slip gradient braking interval $VS_{braking}$, the slip blocking value $S_{threshold2}$, or the slip gradient blocking interval $VS_{blocking}$—tire type, ground type, ground conditions, speed or axle load distribution, actuation of the gas pedal, the engine generates no useable torque, a retarder system is active, or the traction vehicle is located on a sloping section. Moreover, by the measuring field 126, the mathematical equation 122, or the characteristic diagram 124 stored in the control unit 102, 106, one or more of the aforementioned parameters may be taken into consideration when controlling or regulating the agricultural vehicle-trailer-combination 10, in particular the trailer brake 110. Further, each control unit 102, 106 may include a memory module 120, or the control unit 102, 106 may include the memory module 120. The mathematical equation 122, the characteristic diagram 124, or the measuring field 126 may be stored in the memory module 120.

Figure 5:
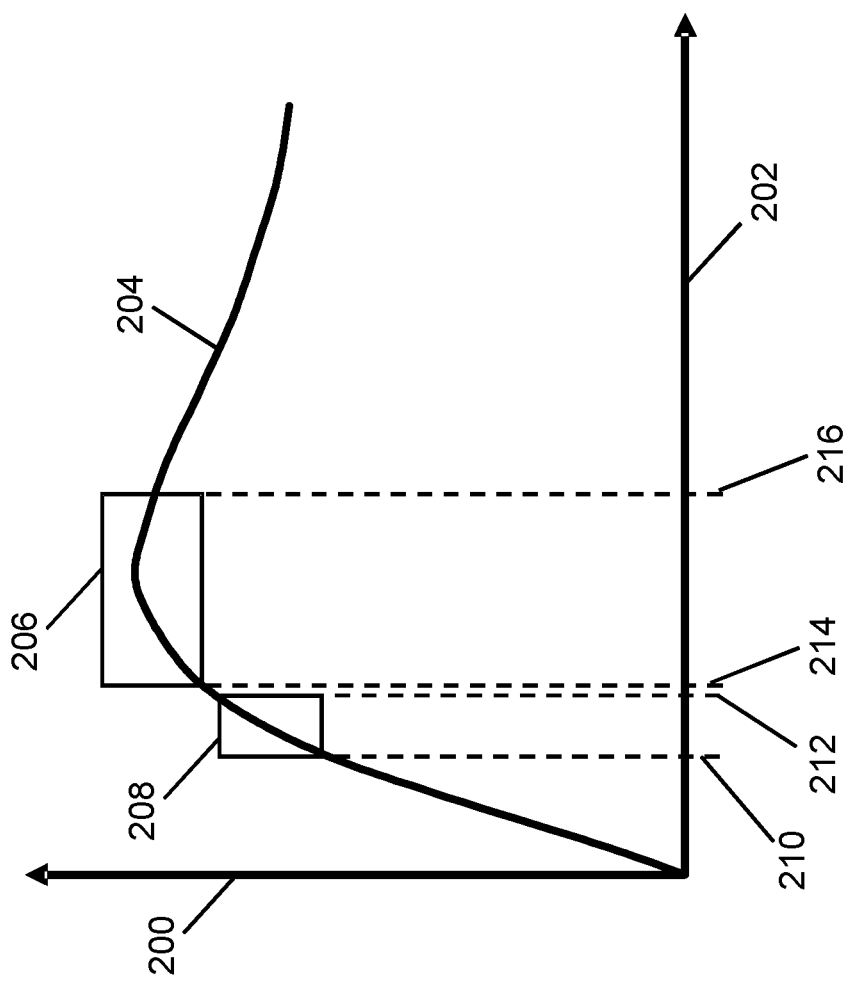
FIG. 5 shows a schematic view of the adhesion-slip curve.

FIG. 5 shows a schematic view of the adhesion-slip curve 204. The facts described hereinafter for FIG. 5 apply to all of the embodiments according to the present disclosure such as those embodiments shown in FIGS. 1 to 4. The slip S is plotted on the x-axis 202 and the adhesion is plotted on the y-axis 200.

The trailer brake 110 is activated and the trailer 16 is braked by the trailer brake 110 when the slip S reaches or exceeds the predeterminable slip braking value of $S_{threshold1}$ (reference numeral 210). Moreover, the trailer brake 110 may be deactivated and the trailer brake 110 may be released when the slip S exceeds a first upper threshold value $S_{threshold3}$ (reference numeral 212). Thus, for the slip S there is a brake control region 208 for activating the trailer brake 110 as a function of the slip S in an interval of $S_{threshold1} \le S \le S_{threshold3}$. Moreover, the engine brake, the service brake 50, or trailer brake 110 may be released when the slip S reaches or exceeds the predeterminable slip blocking value $S_{threshold2}$ (reference numeral 214). The engine brake, the service brake 50, or the trailer brake 110 may be activated again when the slip S exceeds a second upper threshold value $S_{threshold4}$ (reference numeral 216). Thus, for the slip S there is an anti-blocking control region 206 for a deactivation of the engine brake, the service brake 50, or the trailer brake 110 as a function of the slip S in an interval of $S_{threshold2} \le S \le S_{threshold4}$. The slip blocking value $S_{threshold2}$ (reference numeral 214) may in this case be greater than the slip braking value $S_{threshold1}$ (reference numeral 210). Moreover, it may be the case that the slip blocking value $S_{threshold3}$ (reference numeral 214) and the first upper threshold value $S_{threshold2}$ coincide, i.e., $S_{threshold3}=S_{threshold2}$.

Moreover, for the slip gradient VS it applies that the trailer brake 110 is activated when the slip gradient VS reaches the predeterminable slip gradient braking interval $VS_{braking}$. The predeterminable slip gradient braking interval $VS_{braking}$ encompasses all of the slip gradients VS permitted in the braking control region 208. Conversely, for the engine brake, the service brake 50, or trailer brake 110 it applies that they are deactivated when the slip gradient VS reaches the predeterminable slip gradient blocking interval $VS_{blocking}$. The predeterminable slip gradient blocking interval $VS_{blocking}$ encompasses all of the slip gradients VS permitted in the anti-blocking control region 206.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural vehicle-trailer-combination, comprising:
    a traction vehicle including an engine and at least one ground engagement mechanism for support on a ground surface, the ground engagement mechanism being connected to the engine by a transmission;
    a trailer coupled to the traction vehicle;
    a service brake located on the traction vehicle and connected to the at least one ground engagement mechanism;
    an engine brake operably connected to the engine to perform a braking function of the traction vehicle;
    a control unit disposed in communication with a sensor, wherein a slip on the ground engagement mechanism is sensed between the ground engagement mechanism and the ground surface; and a trailer brake disposed on the trailer, the trailer brake being adjustably controlled by the control unit;

wherein the trailer brake is adjustably controlled by the control unit when at least one of the service brake and the engine brake of the traction vehicle is actuated;

wherein the trailer is braked by activating the trailer brake as a function of the slip when the slip reaches or exceeds a first predeterminable slip braking value which is greater than zero;

wherein the trailer brake is released when the slip reaches or exceeds a first upper threshold value which is greater than the first predeterminable slip braking value;

wherein the engine brake, the service brake, and the trailer brake are released by the control unit when the slip reaches or exceeds a predeterminable slip blocking value which is greater than or equal to the first upper threshold value; and wherein at least one of the engine brake, the service brake, and the trailer brake are activated again when the slip reaches or exceeds a second upper threshold value which is greater than the predeterminable slip blocking value.

2. The combination as claimed in claim 1, wherein the sensor comprises a speed sensor for sensing a speed of the ground engagement mechanism.

3. The combination as claimed in claim 2, wherein the control unit operably determines a slip of the ground engagement mechanism from the speed sensed by the sensor.

4. The combination as claimed in claim 1, wherein the traction vehicle comprises a position determining system.

5. The combination as claimed in claim 4, wherein the position determining system comprises a radar sensor or a GPS system.

6. The combination as claimed in claim 1, wherein the slip braking value is determined by the control unit as a function of one or more of a tire type, a ground type, ground conditions, speed, axle load distribution, actuation of a gas pedal, the engine generates no useful torque, a retarder system is active, and the traction vehicle is located on a sloping section.

7. The combination as claimed in claim 1, wherein the slip blocking value is determined by the control unit as a function of one or more of a tire type, a ground type, ground conditions, speed, axle load distribution, actuation of a gas pedal, the engine generates no useful torque, a retarder system is active, and the traction vehicle is located on a sloping section.

8. The combination as claimed in claim 1, wherein a mathematical equation, a characteristic diagram or a measuring field is stored in the control unit, the control unit determining the slip braking value, the slip gradient braking interval, the slip blocking value, or the slip gradient blocking interval from the mathematical equation, the characteristic diagram or the measuring field.

9. The combination as claimed in claim 1, wherein:

a measuring field, a mathematical equation or a characteristic diagram is stored in the control unit;

the trailer brake is controlled by the control unit as a function of at least one of a tire type, a ground type, ground conditions, speed, an axle load distribution, an actuation of a gas pedal, the engine generates no useful torque, a retarder system is active, and the traction vehicle is located on a sloping section.

10. An agricultural vehicle-trailer-combination, comprising:

a traction vehicle including an engine and a plurality of ground engagement mechanisms for support on a ground surface;

a trailer coupled to the traction vehicle;

a service brake located on the traction vehicle and connected to the at least one ground engagement mechanism;

an engine brake operably controlled by the engine to perform a braking function of the traction vehicle;

a control unit disposed in communication with a sensor, wherein a slip or a slip gradient on the plurality of ground engagement mechanisms is sensed between the plurality of ground engagement mechanisms and the ground surface; and a trailer brake adjustably controlled by the control unit to perform a braking function of the trailer;

wherein the trailer brake is adjustably controlled by the control unit when at least one of the service brake and the engine brake of the traction vehicle is actuated;

wherein the trailer is braked by activating the trailer brake as a function of the slip gradient when the slip gradient reaches a predeterminable slip gradient braking interval which is greater than zero;

wherein the trailer brake is released when the slip gradient exceeds the first predeterminable slip braking interval;

wherein the engine brake, the service brake, and the trailer brake are released by the control unit when the slip gradient reaches a predeterminable slip gradient blocking interval which is greater than the predeterminable slip braking interval; and wherein at least one of the engine brake, the service brake, and the trailer brake are activated again when the slip gradient exceeds the predeterminable slip gradient blocking interval.

11. The combination as claimed in claim 10, wherein the traction vehicle comprises a position determining system.

12. The combination as claimed in claim 10, wherein the slip gradient braking interval and the slip gradient blocking interval are determined by the control unit as a function of one or more of a tire type, a ground type, ground conditions, speed, axle load distribution, actuation of a gas pedal, the engine generates no useful torque, a retarder system is active, and the traction vehicle is located on a sloping section.

* * * * *